United States Patent
Ratinen et al.

(10) Patent No.: US 11,241,648 B2
(45) Date of Patent: Feb. 8, 2022

(54) APPARATUS AND METHOD FOR CLEANING A STREAM

(71) Applicant: TEKNOLOGIAN TUTKIMUSKESKUS VTT OY, Espoo (FI)

(72) Inventors: Sampo Ratinen, Espoo (FI); Yrjo Solantausta, Espoo (FI); Matti Nieminen, Espoo (FI); Christian Lindfors, Espoo (FI); Anssi Kalli, Espoo (FI)

(73) Assignee: TEKNOLOGIAN TUTKIMUSKESKUS VTT OY, Espoo (FI)

( * ) Notice: Subject to any disclaimer, the term of this patent is extended or adjusted under 35 U.S.C. 154(b) by 176 days.

(21) Appl. No.: 16/612,674

(22) PCT Filed: May 9, 2018

(86) PCT No.: PCT/FI2018/050351
§ 371 (c)(1),
(2) Date: Nov. 11, 2019

(87) PCT Pub. No.: WO2018/206851
PCT Pub. Date: Nov. 15, 2018

(65) Prior Publication Data
US 2020/0061513 A1    Feb. 27, 2020

(30) Foreign Application Priority Data
May 11, 2017 (FI) .................................. 20175424

(51) Int. Cl.
*B01D 46/24* (2006.01)
*B01D 46/38* (2006.01)
(Continued)

(52) U.S. Cl.
CPC ......... *B01D 46/2407* (2013.01); *B01D 46/24* (2013.01); *B01D 46/38* (2013.01);
(Continued)

(58) Field of Classification Search
CPC ............... B01D 46/0063; B01D 46/24; B01D 46/2407; B01D 46/38; B01D 2267/70;
(Continued)

(56) References Cited

U.S. PATENT DOCUMENTS 4,106,999 A    8/1978  Koppelman et al.
4,973,458 A   11/1990  Newby et al.
(Continued)

FOREIGN PATENT DOCUMENTS

CA        1092789 A        1/1981
DE   102007032126 A1 *    2/2009   ............. B01D 46/30
(Continued)

OTHER PUBLICATIONS

WO2012041489A1_ENG (Espacenet machine translation of Leibold) (Year: 2012).*
(Continued)

*Primary Examiner* — Jonathan Miller
*Assistant Examiner* — Gabriel E Gitman
(74) *Attorney, Agent, or Firm* — Brooks Kushman P.C.

(57) ABSTRACT

An apparatus and a method for cleaning a stream. The apparatus having at least one hot filtration device, which includes a filter vessel and at least one filter candle located inside the filter vessel, an inlet of medium in an upper part of the filter vessel for supplying the medium including particles to the filter vessel, an outlet of the medium in the bottom part for discharged the medium from the filter vessel, a moving bed including the medium which is arranged in the vessel so that the filter candle is inside the moving bed, at least one feed inlet for supplying the stream to the filter vessel, and at least one gas outlet for supplying a purified gas out from the filter vessel.

16 Claims, 3 Drawing Sheets

(51) Int. Cl.
*C10B 49/18* (2006.01)
*C10B 47/20* (2006.01)

(52) U.S. Cl.
CPC ...... *B01D 2267/70* (2013.01); *B01D 2273/20* (2013.01); *C10B 47/20* (2013.01); *C10B 49/18* (2013.01)

(58) Field of Classification Search
CPC ..... B01D 2273/20; C10B 47/10; C10B 49/18; C10B 49/10; F27B 9/00; B01J 8/1818; B01J 8/44; B01J 8/1872
See application file for complete search history.

(56) References Cited

U.S. PATENT DOCUMENTS

| | | | | |
|---|---|---|---|---|
| 5,198,002 A | * | 3/1993 | Mei | B01D 46/0083 422/177 |
| 5,505,906 A | * | 4/1996 | Engstrom | F23J 15/025 422/145 |

FOREIGN PATENT DOCUMENTS

| | | | | |
|---|---|---|---|---|
| DE | 102007032126 A1 | | 2/2009 | |
| DE | WO2012041489 A1 | * | 4/2012 | ............. C10B 47/44 |
| WO | 2012041489 A1 | | 4/2012 | |
| WO | 2015179794 A1 | | 11/2015 | |

OTHER PUBLICATIONS

DE102007032126A1_ENG (Espacenet machine translation of Reichmann) (Year: 2009).*
Search Report prepared by the Finnish Patent and Registraction Office, Dated Aug. 30, 2017, 2 pages.
International Search Report for PCT/FI2018/050351, dated Aug. 6, 2018, 2 pages.

* cited by examiner

APPARATUS AND METHOD FOR CLEANING A STREAM

CROSS-REFERENCE TO RELATED APPLICATION

This application is the U.S. national phase of PCT Application No. PCT/FI2018/050351 filed on May 9, 2018, which claims priority to FI Patent Application No. 20175424 filed on May 11, 2017, the disclosures of which are incorporated in their entirety by reference herein.

FIELD OF THE INVENTION

The invention relates to an apparatus and a method for cleaning a stream, e.g. a gas stream, liquid stream, solid based stream or their combination.

BACKGROUND OF THE INVENTION

Known from the prior art is to purify different gas streams by hot gas filters. Candle filters get dirty easily in typical hot gas filters, and the candle filters are difficult to clean. Further, a hot gas filtration of gases containing sticky particles is difficult because a removal of dust cake is difficult from surfaces of the filter.

Further, it is known from the prior art that cyclones are used to remove solid material from pyrolysis gases after the pyrolysis. However, small dust and solid particles cannot be removed effectively from the pyrolysis gases with this kind of system. Pyrolysis liquid can be cleaned after a condensation but a filtration of high viscosity liquid is very challenging task. Solids are harmful in the bio-oils, such as pyrolysis liquids, because they cause corrosion in combustion engines and deactive the catalyst during the upgrading process. Further, many impurities, e.g. metals, are detrimental for catalysts used in a catalytic upgrading process.

OBJECTIVE OF THE INVENTION

The objective of the invention is to disclose a new type apparatus and method for cleaning different streams. Further, the objective of the invention is to remove different impurities effectively from the gases. Further, the objective of the invention is to remove different impurities from the other streams. Further, the objective of the invention is to purify pyrolysis gas. Further, the objective of the invention is to treat and purify solid based material. Further, the objective of the invention is to produce a purified pyrolysis gas product.

SUMMARY

The apparatus and method and use according to the invention are characterized by what has been presented in the claims.

BRIEF DESCRIPTION OF THE DRAWINGS

The accompanying drawings, which are included to provide a further understanding of the invention and constitutes a part of this specification, illustrate some embodiments of the invention and together with the description help to explain the principles of the invention. In the drawings.

DETAILED DESCRIPTION

Figure 1:
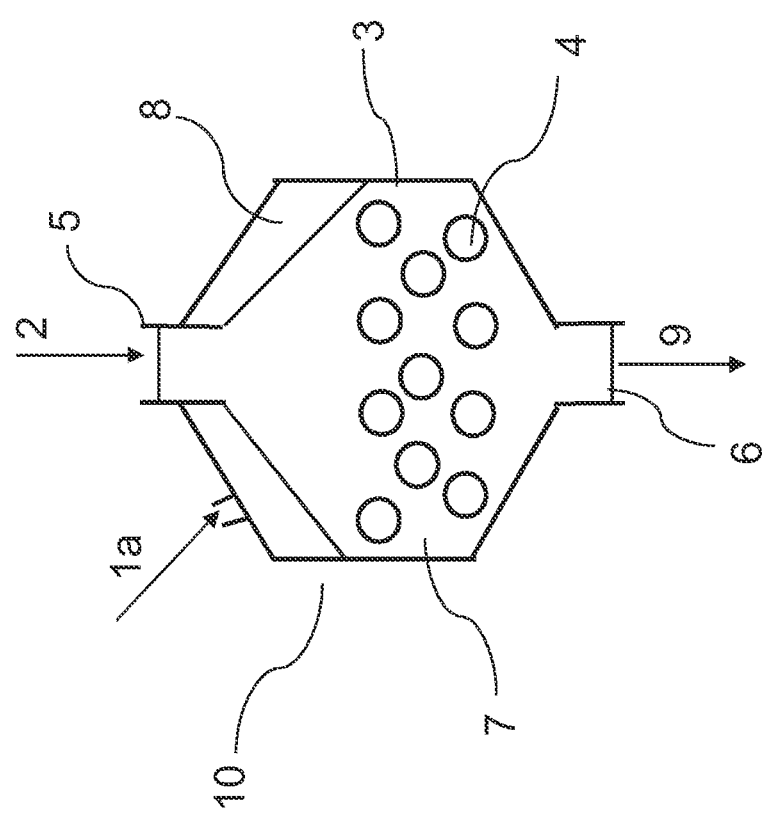
FIG. 1 is an illustration of an apparatus according to one embodiment.

The invention is based on an apparatus for cleaning a stream. The apparatus comprises at least one hot filtration device (10), which comprises a filter vessel (3) and at least one filter candle (4) located inside the filter vessel, an inlet (5) of medium in an upper part of the filter vessel (3) for supplying the medium (2) comprising particles to the filter vessel, an outlet of the medium (6) in the bottom part of the filter vessel (3) for discharged the medium from the filter vessel, a moving bed (7) comprising the medium which is arranged in the vessel so that the filter candle (4) is inside the moving bed (7), at least one feed inlet for supplying the stream (1) to the filter vessel, and at least one gas outlet for supplying a purified gas (11) out from the filter vessel.

Figure 2:
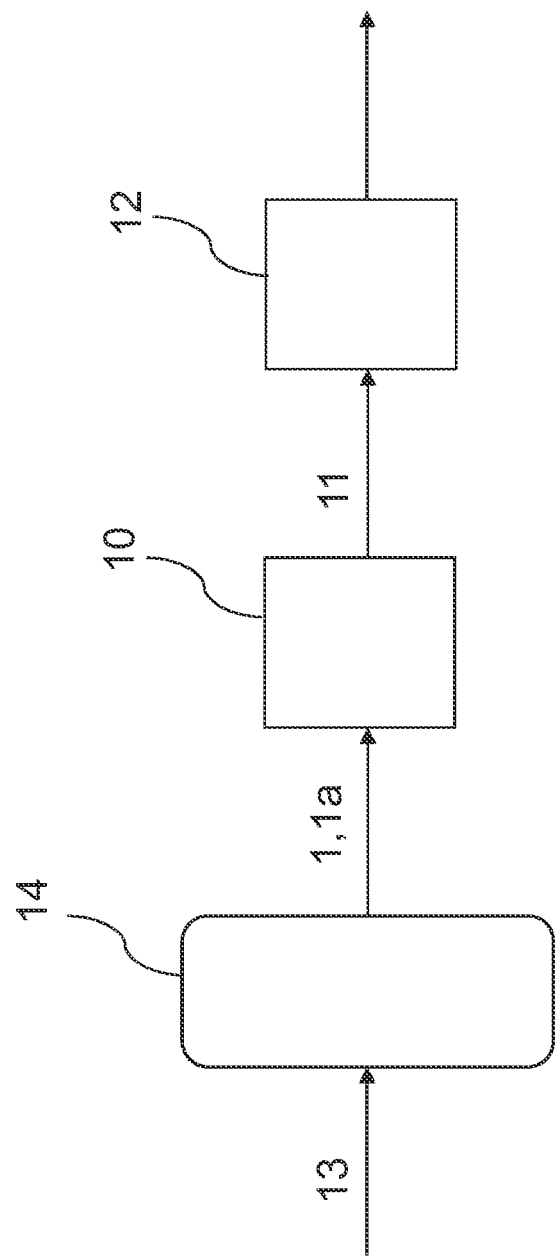
FIG. 2 is a flow chart illustration of a process according to one embodiment.
Figure 3:
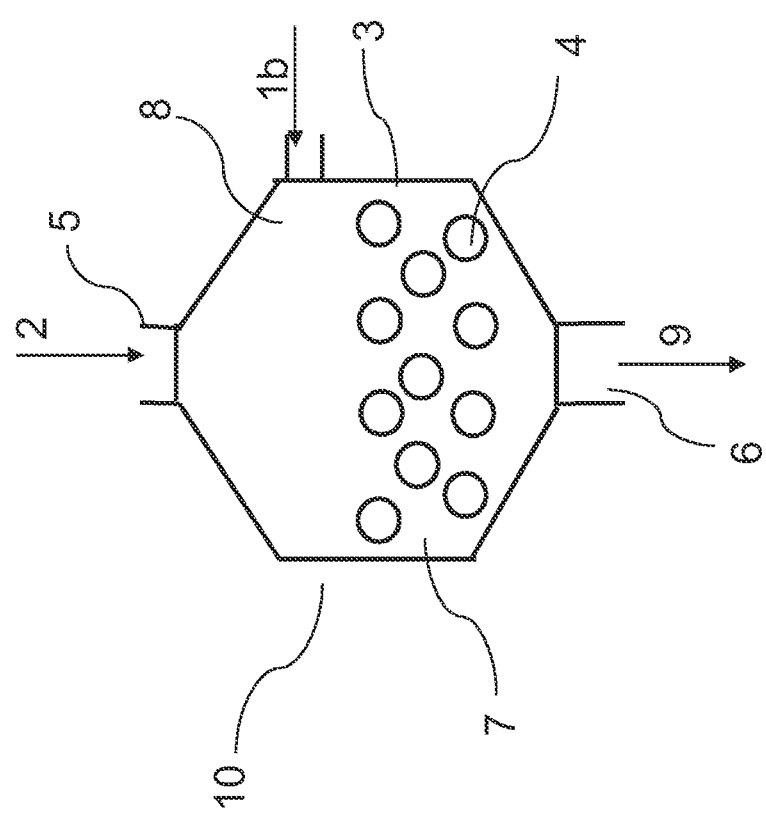
FIG. 3 is an illustration of an apparatus according to another embodiment.

One embodiment of the apparatus is shown in FIG. 1. Another embodiment of the apparatus is shown in FIG. 3. One embodiment of the process of the invention is shown in FIG. 2.

Further, the invention is based on a method for cleaning a stream. The method comprises supplying medium (2) comprising particles into an upper part of the filter vessel (3) of the hot filtration device (10) which comprises at least one filter candle (4) inside the filter vessel, discharging the medium (6) from the bottom part of the filter vessel (3), arranging a moving bed (7) comprising the medium in the vessel so that the filter candle (4) is arranged inside the moving bed (7), supplying the stream (1) to the filter vessel, and supplying a purified gas (11) out from the filter vessel (3).

In this context, the medium (2) means any medium which comprises particles and which can be used in the hot filtration device. Preferably, the medium is in the form of solid. The medium may comprise the particles with different sizes. In one embodiment, the medium is selected from the group comprising inert particles, sand, active particles, catalyst particles, absorbent particles and their combinations. In one embodiment, the medium (2) comprises inert particles, e.g. titanium oxide or aluminum oxide. In one embodiment, the medium (2) comprises sand particles. In one embodiment, the medium (2) comprises catalyst particles. When the medium comprises the catalyst particles, the stream, e.g. pyrolysis gas, can be simultaneously upgraded during the filtration. In one embodiment, the medium acts as a filtration medium. In one embodiment, the medium acts also as a cleaning media of the filter candle (4). In one embodiment, the medium acts as an attrition medium.

In one embodiment, the inlet (5) of the medium is in a top part or top of the filter vessel (3). The inlet of the medium may be any suitable inlet known per se, e.g. pipe, port or the like. Preferably, the medium (2) is arranged to flow slowly downwards by the action of gravitation. Then the moving bed (7) forms in the filter vessel (3). Preferably, the feed of the medium (2) is supplied over the surface of the moving bed (7). Then the surface of the moving bed (7) is reformed all the time. In one embodiment, the particles of the medium flow slowly downwards around the filter candle (4) in the filter vessel (3) and the surface of the filter candle (4) is cleaned simultaneously by means of slowly flowing of the medium (2). Preferably, the medium particles break a possible dust cake on the filter candle and thus the sticky dust cake cannot form. Then formation of the dust cakes can be decreased on the surfaces of the filter candles.

In this context, the stream (1) means any stream, such as any gas stream (1a), liquid stream, solid based stream (1b) or their combination. The gas stream (1a) may comprise any gas, vapor or the like. The solid based stream may comprise any solids, suspension containing solid agents, slurry or the like. The liquid stream may comprise any liquid, liquor or the like. The stream (1) may comprise one or more than one components. Typically the stream comprises some impurities, such as dust, solid particles, char, solid metals, alkalimetal salts, sticky components and/or inorganic agents or compounds. In one embodiment, the stream (1) is biomass derived stream, biomass, biogas, synthesis gas, flue gas, gasification gas, material from biomass treating process or their combination. In one embodiment, the gas stream (1a) is biomass derived gas, biogas, synthesis gas, flue gas, pyrolysis gas, gasification gas, gas from biomass treating process, gas containing sticky particles or their combination. In one embodiment, the gas stream (1a) is pyrolysis gas, gasification gas or their combination. In one embodiment, the solid based stream (1b) is a material stream for a pyrolysis, biomass derived stream, biomass or their combination.

In one embodiment, the stream (1), preferably the gas stream (1a), is supplied to an upper part of the filter vessel (3). In one embodiment, the apparatus comprises a feed inlet for supplying the stream (1), preferably the gas stream (1a), to an upper part of the filter vessel. In one embodiment, the stream (1), preferably the solid based stream (1b), is supplied to the medium (2) in the filter vessel, preferably to the moving bed (7) of the filter vessel. In one embodiment, the apparatus comprises a feed inlet for supplying the stream (1), preferably the solid based stream (1b), to the medium (2) in the filter vessel, preferably to the moving bed (7) of the filter vessel. In one embodiment, the feed inlet is in connection with a side wall of the filter vessel (3) for supplying the solid based stream (1b) to the moving bed (7) of the filter vessel. It is important that the solid based stream (1b) is in contact with the medium (2). The feed inlet of the stream may be any suitable inlet known per se, e.g. pipe, port or the like.

In one embodiment, the apparatus comprises a space (8) to which the stream (1), preferably the gas stream (1a), is supplied and which is arranged over the surface of the moving bed (7) in the upper part of the filter vessel (3). In one embodiment, the space (8) to which the stream (1), preferably the gas stream (1a), is supplied is arranged over the surface of the moving bed (7) in the upper part of the filter vessel. In one embodiment, the size of the space (8) is minimized in the upper part of the filter vessel.

In one embodiment, the stream (1) is fed to the filter vessel (3) from one feed point or from two feed points or from more than two feed points. In one embodiment, the stream (1) is fed to the filter vessel (3) from at least two feed points in order to provide an uniform distribution of the feed in the filter vessel. In one embodiment, the gas stream (1a) is fed to the filter vessel (3) from at least two feed points in order to minimize pressure drop of the filter vessel. The stream (1,1a,1b) can be fed or supplied by means of a feeding device to the apparatus. In this context, the feeding device can be any feeding device, equipment or other suitable device for supplying the stream to the apparatus. In one embodiment, the feeding device is selected from the group comprising pump, compressor, tube, pipe, screw, other suitable feeding device and their combinations.

In one embodiment, temperature of the gas stream (1a) is between room temperature and 800° C., in one embodiment 20-800° C. In one embodiment, short residence time of the gas stream (1a) is used in the hot filtration device (10). In one embodiment, linear velocity of the gas stream which flows through the filter candle (4) is 1-20 cm/s.

In one embodiment, the apparatus comprises more than one filter candles (4). In one embodiment, the filter candle (4) is made of metal, ceramic material or their combination. In one embodiment, the layer of the medium is minimized over the filter candles. However, it is important that the filter candles are inside the medium of the motive bed. Any suitable filter candle known per se can be used as the filter candle in the apparatus according to the invention.

In one embodiment, the apparatus comprises at least one horizontal filter candle (4) located inside the filter vessel. In one embodiment, the apparatus comprises more than one filter candles (4). In one embodiment, the apparatus comprises one or more layers of the filter candles (4). In one embodiment, the apparatus comprises more than one layer of the filter candles. Preferably, the layer comprises more than one filter candles. In one embodiment, the apparatus comprises at least one vertical filter candle (4) located inside the filter vessel. In one embodiment, the apparatus comprises more than one filter candles (4) which can be arranged in parallel.

In one embodiment, the purified gas (11) is supplied out from the filter candles (4).

The outlet (6) of the medium may be any suitable outlet known per se, e.g. pipe, outlet port or the like. In one embodiment, the apparatus comprises at least one screw in the bottom part of the filter vessel (3) to facilitate the removal of the medium. In one embodiment, the apparatus comprises at least one guide in the bottom part of the filter vessel to facilitate the removal of the medium. Any suitable screw and guide known per se can be used as the screw and guide in the apparatus according to the invention.

Any suitable filter vessel known per se can be used as the filter vessel (3) in the apparatus according to the invention. Any suitable shape can be used as the shape of the filter vessel (3).

In one embodiment, the apparatus comprises more than one hot filtration devices (10). In one embodiment, at least two hot filtration devices (10) are arranged in parallel.

In one embodiment, impurities, preferably in the solid form, are removed from the stream (1) in the filter vessel (3). In one embodiment, the solid impurities can be discharged from the filter vessel (3) together with the particles of the medium (2). In one embodiment, dust is removed from the stream (1), e.g. from the gas stream (1a). In one embodiment, the dust can be discharged from the filter vessel (3) together with the particles of the medium (2). In one embodiment, solids such as solid particles and char are removed from the stream, e.g. from the gas stream. In one embodiment, solid metals, e.g. some solid heavy metals, are removed from the stream, e.g. from the gas stream. In one embodiment, solid contaminants such as alkalimetal salts are removed from the stream, e.g. from the gas stream. In one embodiment, a sticky component, e.g. a sticky cake, can be discharged from the filter vessel (3) together with the particles of the medium (2). In one embodiment, inorganic agents or compounds are removed from the stream (1). In one embodiment, gaseous inorganic agents or compounds are removed from the stream, especially if the medium (2) comprises absorbent particles.

In one embodiment, the medium (2) is cleaned after the hot filtration device (10). In one embodiment, the medium (2) is cleaned by removing impurities, catalyst particles, absorbent particles, char and/or ash by means of sieving, e.g. by mechanical sieving or wind sieving, after the hot filtration device (10). In one embodiment, the medium (2) is cleaned by removing the impurities, some hydrocarbons and/or char by means of oxidation after the hot filtration device (10). In one embodiment, the medium (2) is cleaned by washing after the hot filtration device (10). In one embodiment, the medium (2) is cleaned in a regenerator. In one embodiment, the catalyst of the medium is supplied to a regenerator after the hot filtration device (10) and from the regenerator back to the hot filtration device. In one embodiment, the apparatus comprises a device for pulse cleaning the filter candles (4).

In one embodiment, the medium (2) is recirculated back to the upper part of the filter vessel (3). In one embodiment, the recirculation is carried out by an elevator, screw or other suitable device. In one embodiment, a loop of the medium (2) is a closed loop in order to avoid the stream flowing, especially the gas flowing, to a wrong direction. In one embodiment, the loop can be closed by rotating valves.

In one embodiment, the stream (1) preferably the gas stream (1a) is supplied from a pyrolysis reactor (14) to the hot filtration device (10). In one embodiment, the apparatus comprises means for supplying the gas stream (1a), such as the pyrolysis gas, from a pyrolysis reactor (14) to the hot filtration device (10). In one embodiment, temperature of the gas stream (1a) is over 400° C. In the hot filtration device the pyrolysis product is purified. The pyrolysis product, such as pyrolysis gas product and later pyrolysis liquid product, which comprises less contaminants or impurities can be formed in the apparatus. In one embodiment, the medium of the hot filtration device comprises the catalyst particles, and then the gas stream, e.g. pyrolysis gas, is simultaneously upgraded during the filtration. In one embodiment, the purified gas (11) is supplied from the hot filtration device (10) to a condenser (12). In one embodiment, the purified gas (11) is supplied from the hot filtration device (10) to a catalytic process. In one embodiment, the medium (2), such as sand and/or catalyst, is recirculated from the hot filtration device (10) to a boiler, which is preferably integrated with the pyrolysis reactor (14), and from the boiler back to the hot filtration device. In one embodiment, the catalyst is supplied to a regenerator after the hot filtration device (10) and from the regenerator back to the hot filtration device.

In one embodiment, the hot filtration device (10) acts as a pyrolysis reactor wherein the solid based stream (1b), e.g. biomass based raw material, is fed directly to the hot filtration device (10). Then a carried gas is not needed during the pyrolysis and size of the vapour condensation system can be reduced. In one embodiment, the medium of the hot filtration device comprises the catalyst particles and the stream is simultaneously upgraded during the filtration. In one embodiment, a purified gas stream (11) can be supplied from the hot filtration device (10) directly to an upgrading process or catalytic process. In one embodiment, the purified gas (11) is supplied from the hot filtration device (10) to a condenser (12). In one embodiment, the purified gas (11) is supplied from the hot filtration device (10) to a catalytic process. In one embodiment, the hot filtration device (10) is integrated to a boiler, preferably to a fluidized-bed boiler. In one embodiment, the medium (2), such as sand and/or catalyst, is recirculated from the hot filtration device (10) to the boiler, which is preferably integrated with the hot filtration device (10), and from the boiler back to the hot filtration device. In one embodiment, the catalyst is supplied to a regenerator after the hot filtration device (10) and from the regenerator back to the hot filtration device.

In one embodiment, the stream (1) preferably the gas stream (1a), such as a gasification gas, is supplied from a gasification device to the hot filtration device (10). In the hot filtration device the gasification gas is purified. Then the gas product which comprises less impurity can be formed in the apparatus. In one embodiment, the purified gas may be supplied from the hot filtration device (10) to a condenser. In one embodiment, the purified gas is supplied from the hot filtration device (10) to a catalytic process.

In one embodiment, the method is based on a continuous process. In one embodiment, the apparatus is a continuous apparatus. In one embodiment, the method is based on a batch process. In one embodiment, the apparatus is a batch apparatus.

In one embodiment, the apparatus and the method of the present invention is used and utilized in the pyrolysis, such as purification and filtration of the pyrolysis gas, in the pyrolysis oil production, in the gasification, such as purification and filtration of the gasification gas, in the purification and filtration of flue gases, in the purification and filtration of gases which comprise sticky dust, in the production of transportation fuels, in the production of biofuels, or their combinations.

Thanks to the invention the different streams can be purified. The apparatus and method of the invention offers a possibility to purify the streams easily and cost-effectively. Further, by means of the invention the purification of the gas streams can be improved. Also the pyrolysis gases can be cleaned prior catalytic process or condensation by means of the invention. Further, the streams, e.g. gas streams, having tendency to form sticky dust cake can be treated according to the apparatus and method of the invention. The formation of the dust cake can be avoided by combining the moving bed in the filter vessel and the filter candles. The surface of the filter candles can be cleaned mechanically by means of the slowly flowing of the medium during the filtration process. Further, thanks to the invention the solid based streams can be treated by pyrolysing in the hot filtration apparatus.

The present invention provides an industrially applicable, simple and affordable way to purify and treat the streams. The method and apparatus of the present invention is easy and simple to realize in connection with a production process, also in a small scale process.

EXAMPLES

Example 1

FIG. 1 presents the apparatus according to the invention for purifying a gas stream.

The apparatus comprises a hot filtration device (10), which comprises a filter vessel (3) and more than one horizontal filter candles (4) located inside the filter vessel. Any suitable filter vessel can be used as the filter vessel (3). The shape of the filter vessel (3) may be varied. Further, the hot filtration device (10) comprises an inlet (5) of medium in an upper part of the filter vessel (3) for supplying the medium (2) comprising particles to the filter vessel, and an outlet of the medium (2) in the bottom part of the filter vessel (3) for discharged the medium from the filter vessel. Further, the hot filtration device (10) comprises a moving bed (7) comprising the medium which is arranged in the vessel so that the filter candles (4) are inside the moving bed (7). Further, the hot filtration device (10) comprises one or more than one feed inlets for supplying the gas stream (1a) to the filter vessel, and at least one gas outlet for supplying a purified gas out from the filter vessel. The purified gas is supplied out from the filter candles (4) of the filter vessel.

The inlet (5) of the medium is in a top of the filter vessel (3). The medium (2) may comprise inert particles, sand, active particles, catalyst particles, absorbent particles and/or their combinations. In this example, the medium acts as a filtration medium of the impurities of the stream and as a cleaning media of the filter candle (4). The medium (2) is arranged to flow slowly downwards by the action of gravitation in order to form the moving bed (7) in the filter vessel (3). The layer of the medium (2) is minimized over the filter candles (4). However, it is important that the filter candles (4) are inside the medium of the motive bed (7).

The apparatus comprises the feed inlets for supplying the gas stream (1a) to an upper part of the filter vessel (3). The apparatus comprises a space (8) to which the gas stream (1a) is supplied and which is arranged over the surface of the moving bed (7) in the upper part of the filter vessel (3). The gas stream (1a) may be biomass derived gas, biogas, synthesis gas, flue gas, pyrolysis gas, gasification gas, gas from biomass treating process, gas containing sticky particles or their combination in this example.

Temperature of the gas stream (1a) is between 20-800° C. Short residence time of the gas stream (1a) is used in the hot filtration device (10). Linear velocity of the gas stream which flows through the filter candle (4) is 1-20 cm/s.

The apparatus comprises at least one screw and/or guide in the bottom part of the filter vessel (3) to facilitate the removal of the medium.

Impurities, preferably in the solid form, are removed from the stream (1) in the filter vessel (3). The solid impurities can be discharged from the filter vessel (3) together with the particles of the medium (2). The medium (2) may be cleaned, e.g. by removing impurities and other particles than, for example, sand particles, after the hot filtration device (10). The medium (2) may be recirculated back to the upper part of the filter vessel (3).

Example 2

FIG. 2 presents the process according to the invention for treating raw material in a pyrolysis and for purifying a gas stream of the pyrolysis.

In the process, the raw material (13) is treated by pyrolysing in a pyrolysis reactor (14). The pyrolysis gas (1,1a) formed in the pyrolysis reactor is supplied from the pyrolysis reactor (14) to the hot filtration device (10) according to Example 1. Temperature of the pyrolysis gas (1a) is over 400° C. In the hot filtration device (10) the pyrolysis gas is purified. The medium of the hot filtration device may comprise the catalyst particles, and then the pyrolysis gas can be simultaneously upgraded during the filtration. The purified gas (11) is supplied from the hot filtration device (10) to a condenser (12). Alternatively, the purified gas (11) may be supplied from the hot filtration device (10) to a catalytic process. The medium (2), such as sand and/or catalyst, may be recirculated from the hot filtration device (10) to a boiler, which is preferably integrated with the pyrolysis reactor (14), and from the boiler back to the hot filtration device. Alternatively, the catalyst may be supplied to a regenerator after the hot filtration device (10) and from the regenerator back to the hot filtration device.

Example 3

FIG. 3 presents the apparatus according to the invention for treating a solid based stream.

The apparatus comprises the hot filtration device (10) which acts as a pyrolysis reactor wherein the solid based stream (1b), e.g. biomass based raw material, is fed directly to the hot filtration device (10). Then a carried gas is not needed during the pyrolysis and size of the vapour condensation system can be reduced.

The hot filtration device (10) comprises a filter vessel (3) and more than one horizontal filter candles (4) located inside the filter vessel. Any suitable filter vessel can be used as the filter vessel (3). The shape of the filter vessel (3) may be varied. Further, the hot filtration device (10) comprises an inlet (5) of medium in an upper part of the filter vessel (3) for supplying the medium (2) comprising particles to the filter vessel, and an outlet of the medium (6) in the bottom part of the filter vessel (3) for discharged the medium from the filter vessel. Further, the hot filtration device (10) comprises a moving bed (7) comprising the medium which is arranged in the vessel so that the filter candles (4) are inside the moving bed (7). Further, the hot filtration device (10) comprises one or more than one feed inlets for supplying the solid based stream (1b) to the filter vessel, and at least one gas outlet for supplying a purified gas out from the filter vessel. The purified gas is supplied out from the filter candles (4) of the filter vessel.

The inlet (5) of the medium is in a top of the filter vessel (3). The medium (2) may comprise inert particles, sand, active particles, catalyst particles, absorbent particles and/or their combinations. The medium (2) is arranged to flow slowly downwards by the action of gravitation in order to form the moving bed (7) in the filter vessel (3). It is important that the filter candles (4) are inside the medium of the motive bed (7).

The apparatus comprises the feed inlets for supplying the solid based stream (1b) to the moving bed (7) of the filter vessel. The feed inlets are in connection with a side wall of the filter vessel (3) for supplying the solid based stream (1b) to the moving bed (7) of the filter vessel. The solid based stream (1b) may be a material stream for a pyrolysis, biomass derived stream, biomass or their combination in this example.

The apparatus comprises at least one screw and/or guide in the bottom part of the filter vessel (3) to facilitate the removal of the medium.

Impurities may be removed from the stream (1b) in the filter vessel (3). The solid impurities can be discharged from the filter vessel (3) together with the particles of the medium (2). The medium (2) may be cleaned, e.g. by removing impurities and other particles than, for example, sand particles, after the hot filtration device (10). The medium (2) may be recirculated back to the upper part of the filter vessel (3).

The medium (2) of the hot filtration device may comprise the catalyst particles and the solid based stream (1b) is simultaneously upgraded during the filtration. Optionally, a purified gas stream (11) can be supplied from the hot filtration device (10) directly to an upgrading process or catalytic process. Alternatively, the purified gas (11) is supplied from the hot filtration device (10) to a condenser (12).

The hot filtration device (10) may be integrated to a boiler, preferably to a fluidized-bed boiler. Then the medium (2), such as sand and/or catalyst, is recirculated from the hot filtration device (10) to the boiler and from the boiler back to the hot filtration device. The catalyst may be supplied to a regenerator and from the regenerator back to the hot filtration device.

Example 4

In this example, raw material was treated in a pyrolysis reactor and a gas stream of the pyrolysis reactor was purified in a hot filtration device.

Stem chips were fed to the pyrolysis reactor. Feed capacity was 0.8 kg/h. Experimental duration was hours in the first experiment and 8 hours in the second experiment. Pyrolysis temperature was 500° C. in the first experiment and 480° C. in the second experiment. Nitrogen feed was 35 l/min NTP, and residence time was 0.8 seconds.

The gas stream of the pyrolysis reactor was supplied to the hot filtration device in which the gas stream was purified. Face velocity of the gas stream was 1.3 cm/seconds. Temperature was 450° C. in the hot filtration device. Sand was used as medium in the filter vessel. Particle size of the sand was 0.2 mm. An amount of the sand was 10 litres in the filter vessel. The sand flow was 3 kg/hour.

It was observed that pressure drop was essentially unchanged during the each experiment. Organic liquid yield decreased by 10 wt % after the hot filtration device. An almost solid and ash free bio-oil was obtained after the hot filtration device.

The pyrolysis devices and equipments used in this invention are known per se in the art, and therefore they are not described in any more detail in this context.

The apparatus and method according to the invention is suitable in different embodiments for purifying and treating different kinds of streams.

The invention is not limited merely to the examples referred to above; instead many variations are possible within the scope of the inventive idea defined by the claims.

The invention claimed is:

1. An apparatus for cleaning a stream, wherein the apparatus comprises at least one hot filtration device, which comprises
a filter vessel and at least one horizontal filter candle located inside the filter vessel forming hot filtration device,
an inlet for a medium in an upper part of the filter vessel for supplying the medium comprising particles to the filter vessel,
an outlet in a bottom part of the filter vessel for discharging the medium from the filter vessel,
a moving bed comprising the medium which is arranged in the vessel so that the filter candle is inside the moving bed,
at least one feed inlet for supplying the stream to the filter vessel, wherein the stream is treated in the filter vessel to form a purified gas, and
at least one gas outlet for supplying the purified gas out from the filter vessel.

2. The apparatus according to claim 1, wherein the medium is selected from a group comprising inert particles, sand, active particles, catalyst particles, absorbent particles and their combinations.

3. The apparatus according to claim 1, wherein the apparatus comprises a feed inlet for supplying the stream to an upper part of the filter vessel, wherein the stream is a gas stream.

4. The apparatus according to claim 1, wherein the apparatus comprises a space to which the stream is supplied and which is arranged over a surface of the moving bed in the upper part of the filter vessel.

5. The apparatus according to claim 1, wherein the apparatus comprises a feed inlet for supplying the stream to the moving bed of the filter vessel, wherein the stream is a solid based stream.

6. The apparatus according claim 1, wherein the hot filtration device acts as a pyrolysis reactor, and wherein a solid based stream is fed directly to the hot filtration device.

7. The apparatus according to claim 1, wherein the medium of the hot filtration device comprises catalyst particles and the stream is simultaneously upgraded during the filtration.

8. A method for cleaning a stream, wherein the method comprises
supplying a medium comprising particles into an upper part in a filter vessel which comprises at least one horizontal filter candle inside the filter vessel,
arranging a moving bed comprising the medium in the vessel so that the filter candle is arranged inside the moving bed,
supplying the stream to the filter vessel in which the stream is treated for forming a purified gas,
supplying the purified gas out from the filter vessel, and
discharging the medium from a bottom part of the filter vessel.

9. The method according to claim 8, wherein the medium is arranged to flow downwards by action of gravitation in order to form the moving bed in the filter vessel.

10. The method according to claim 8, wherein the stream is a gas stream, a liquid stream, a solid based stream or their combination.

11. The method according to claim 8, wherein the stream is a gas stream that is a biomass derived gas, a biogas, a synthesis gas, a flue gas, a pyrolysis gas, a gasification gas, gas from a biomass treating process, a gas containing sticky particles or their combination.

12. The method according to claim 8, wherein the stream is a solid based stream that is a material stream for a pyrolysis reactor, a biomass derived stream, a biomass or their combination.

13. The method according to claim 8, wherein impurities are removed from the stream in the filter vessel.

14. The method according to claim 8, wherein the medium is cleaned after the medium is discharged from the bottom of the filter vessel.

15. The method according to claim 8, wherein the medium is recirculated back to the upper part of the filter vessel.

16. The method according to claim 8, wherein the stream is a gas stream that is supplied from a pyrolysis reactor to the filter vessel.

* * * * *